United States Patent
Spoonhower et al.

(10) Patent No.: US 7,352,926 B2
(45) Date of Patent: *Apr. 1, 2008

(54) VISUAL DISPLAY WITH ELECTRO-OPTICAL ADDRESSING ARCHITECTURE

(75) Inventors: John P. Spoonhower, Webster, NY (US); David L. Patton, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 363 days.

This patent is subject to a terminal disclaimer.

(21) Appl. No.: 11/095,167

(22) Filed: Mar. 31, 2005

(65) Prior Publication Data

US 2006/0227840 A1   Oct. 12, 2006

(51) Int. Cl.
*G02B 6/26* (2006.01)
(52) U.S. Cl. .................................................. 385/15
(58) Field of Classification Search ............... None
See application file for complete search history.

(56) References Cited

U.S. PATENT DOCUMENTS

| 6,028,977 | A | 2/2000 | Newsome |
| 6,724,511 | B2 | 4/2004 | Gudesen et al. |
| 6,727,644 | B2 | 4/2004 | Hatwar et al. |
| 7,113,663 | B1 * | 9/2006 | Spoonhower et al. ......... 385/16 |
| 7,120,332 | B1 * | 10/2006 | Spoonhower et al. ......... 385/25 |
| 2002/0003928 | A1 | 1/2002 | Bischel et al. |
| 2004/0101822 | A1 | 5/2004 | Wiesner et al. |
| 2004/0240782 | A1 * | 12/2004 | de Almeida et al. ......... 385/27 |
| 2006/0222286 | A1 * | 10/2006 | Spoonhower et al. ......... 385/15 |
| 2006/0291769 | A1 * | 12/2006 | Spoonhower et al. ......... 385/14 |

OTHER PUBLICATIONS

Joyce K. S. Poon et al.; Wide-Range Tuning of Polymer Microring Resonators by the Photobleaching of CLD-1 Chromophores; Optics Letters, vol. 29, No. 22, Nov. 15, 2004; pp. 2584-2586.
W. Y. Chen et al.; High-Finesse Laterally Coupled Single-Mode Benzocyclobutene Microring Resonators; IEEE Photonics Technology Letters, vol., 16, No. 2, Feb. 2004; pp. 470-472.
Chung-yen Chao et al.; Polymer Microring Resonatoers Fabricated by Nanoimprint Technique; J. Vac. Sci. Technol. B 20(6), Nov./Dec. 2002; pp. 2862-2866.
Xuefeng Wang et al.; Liquid Crystal Polymer (LCP) for MEMS: Processes and Applications; Journal of Micromechanics and Microengineering; May 2003; pp. 628-633.

* cited by examiner

*Primary Examiner*—Michelle Connelly-Cushwa
*Assistant Examiner*—Chris Chu
(74) *Attorney, Agent, or Firm*—Frank Pincelli

(57) ABSTRACT

A display device and method of operating the display device. The display device comprising a support substrate, a plurality of light emitting resonators placed in a matrix on the support substrate forming a plurality of rows and columns of the light emitting resonators, a plurality of light waveguides positioned on the substrate such that each of the light emitting resonators is associated with an electro-coupling region with respect to one of the plurality of light waveguides, a deflection mechanism for causing relative movement between a portion of at least one of the plurality of light waveguides and the associated light emitting resonator so as to control when the light emitting resonator is in the electro-coupling region, and a light source associated with each of the plurality of light waveguides for transmitting a light along the plurality of light waveguides for selectively activating each of the light emitting resonators when positioned within the electro-coupling region.

31 Claims, 12 Drawing Sheets

VISUAL DISPLAY WITH ELECTRO-OPTICAL ADDRESSING ARCHITECTURE

CROSS REFERENCE TO RELATED APPLICATIONS

U.S. Ser. No. 11/096,032, filed concurrently herewith, of John P. Spoonhower, David Lynn Patton and Frank Pincelli, entitled "Visual Display With Electro-Optical Individual Pixel Addressing Architecture";

U.S. Ser. No. 11/096,031, filed concurrently herewith, of John P. Spoonhower and David Lynn Patton, entitled "Polarized Light Emitting Source With An Electro-Optical Addressing Architecture"; and U.S. Ser. No. 11/094,855, filed concurrently herewith, of John P. Spoonhower, and David Lynn Patton entitled "Placement Of Lumiphores Within A Light Emitting Resonator In A Visual Display With Electro-Optical Addressing Architecture";

FIELD OF THE INVENTION

A flat panel visible display wherein optical waveguides and other thin film structures are used to distribute (address) excitation light to a patterned array of visible light emitting pixels.

BACKGROUND OF THE INVENTION

A flat panel display system is based on the generation of photo-luminescence within a light cavity structure. Optical power is delivered to the light emissive pixels in a controlled fashion through the use of optical waveguides and a novel addressing scheme employing Micro-Electro-Mechanical Systems (MEMS) devices. The energy efficiency of the display results from employing efficient, innovative photoluminescent species in the emissive pixels and from an optical cavity architecture, which enhances the excitation processes operating inside the pixel. The present system is thin, light weight, power efficient and cost competitive to produce when compared to existing technologies. Further advantages realized by the present system include high readability in varying lighting conditions, high color gamut, viewing angle independence, size scalability without brightness and color quality sacrifice, rugged solid-state construction, vibration insensitivity and size independence. The present invention has potential applications in military, personal computing and digital HDTV systems, multi-media, medical and broadband imaging displays and large-screen display systems. Defense applications may range from full-color, high-resolution, see-through binocular displays to 60-inch diagonal digital command center displays. The new display system employs the physical phenomena of photo-luminescence in a flat-panel display system.

Previously, Newsome disclosed the use of upconverting phosphors and optical matrix addressing scheme to produce a visible display in U.S. Pat. No. 6,028,977. Upconverting phosphors are excited by infrared light; this method of visible light generation is typically less efficient than down-conversion (luminescent) methods like direct fluorescence or phosphorescence, to produce visible light. Furthermore, the present invention differs from the prior art in that a different addressing scheme is employed to activate light emission from a particular emissive pixel. The method and device disclosed herein does not require that two optical waveguides intersect at each light emissive pixel. Furthermore, novel optical cavity structures, in the form of optical light emitting resonators, are disclosed for the emissive pixels in the present invention.

Additionally, in U.S. Patent Application Publication US2002/0003928A1, Bischel et al. discloses a number of structures for coupling light from the optical waveguide to a radiating pixel element. The use of reflective structures to redirect some of the excitation energy to the emissive medium is disclosed. In the present invention, we disclose the use of novel optical cavity structures, in the form of ring or disk resonators, the resonators themselves modified to affect the emission of visible light.

The use of such resonators further allows for a novel method of control of the emission intensity, through the use of Micro-Electro-Mechanical Systems (MEMS) devices to alter the degree of power coupling between the light power delivering waveguide and the emissive resonator pixel. Such means have been disclosed in control of the power coupling to opto-electronic filters for telecommunications applications. In this case, the control function is used to tune the filter. Control over the power coupling is described in "A MEMS-Actuated Tunable Microdisk Resonator", by Ming-Chang M. Lee and Ming C. Wu, paper MC3, 2003 IEEE/LEOS International Conference on Optical MEMS, 18-21 Aug. 2003.

SUMMARY OF THE INVENTION

In accordance with one aspect of the present invention there is provided a display device, comprising:

a. a support substrate;

b. a plurality of light emitting resonators placed in a matrix on the support substrate forming a plurality of rows and columns of the light emitting resonators;

c. a plurality of light waveguides positioned on the substrate such that each of the light emitting resonators is associated with an electro-coupling region with respect with to one of the plurality of light waveguides;

d. a deflection mechanism for causing relative movement between a portion of at least one of the plurality of light waveguides and the associated light emitting resonator so as to control when the light emitting resonator is in the electro-coupling region; and e. a light source associated with each of the plurality of light waveguides for transmitting a light along the plurality of light waveguides for selectively activating each of the light emitting resonators when positioned within the electro-coupling region.

In accordance with another aspect of the present invention there is provided a method for controlling visible light emitting from a display device having a plurality of light emitting resonators placed in a pattern forming a plurality of rows and columns and a plurality of wave light guides positioned so that each of the light emitting resonators is positioned adjacent one of the plurality of wave light guides comprising the steps of:

a) providing a light source associated with each of the plurality of light waveguides for transmitting a light along the associated light waveguide;

a) providing deflection mechanism for causing relative movement between a portion of at least one of the plurality of light waveguides and the associated light emitting resonator so as to control when the light emitting resonator is in the electro-coupling region;

b) selectively controlling emission of visible light from the plurality of light emitting resonators by controlling the deflection mechanism and light source such that when the light emitting resonator in the electro-coupling region and a light is transmitted along the associated light waveguide the emission of visible light will occur.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
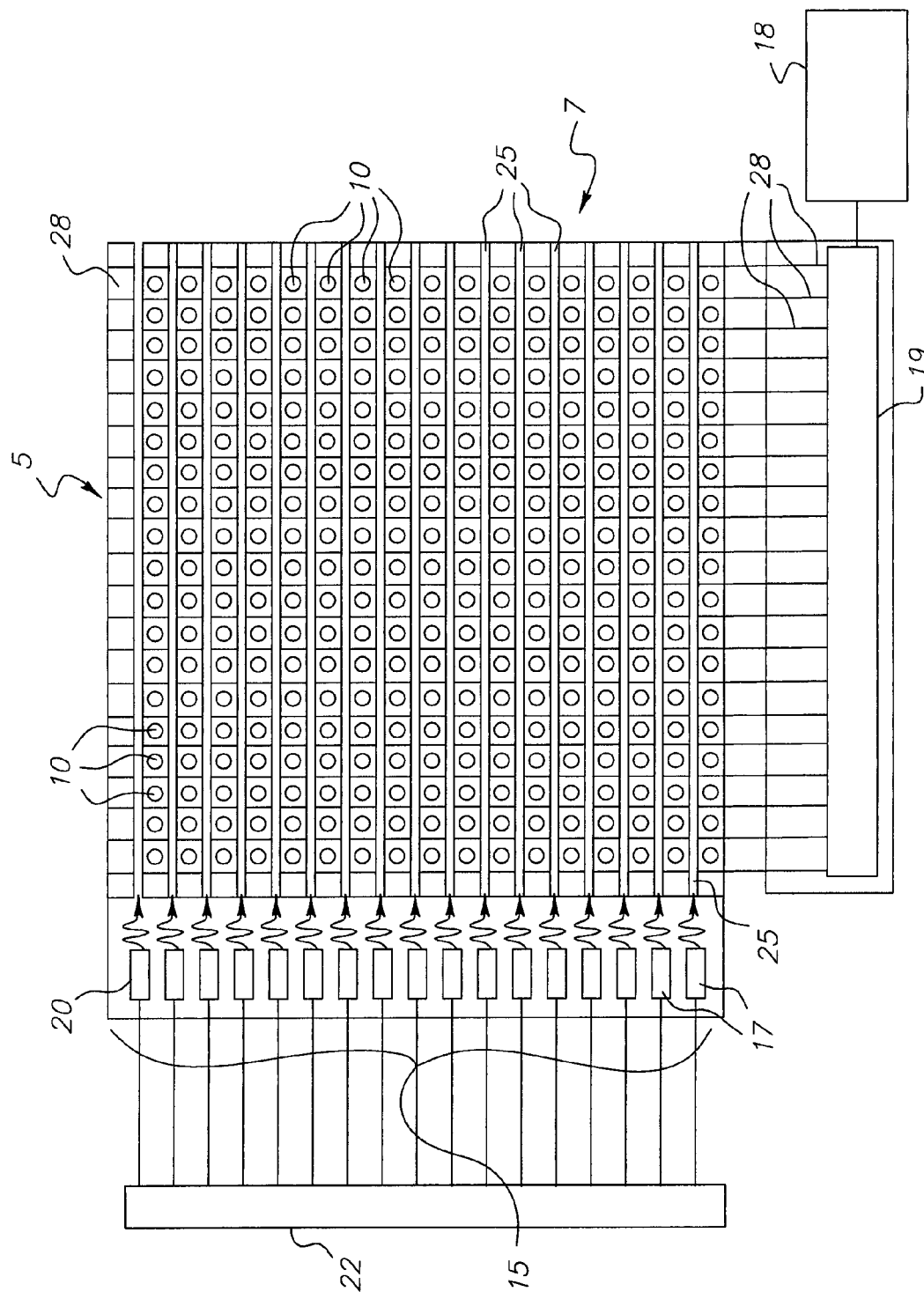
FIG. 1 is a schematic top view of an optical flat panel display made in accordance with the present invention.

Referring to FIGS. 1-2 there is illustrated a photo-luminescent display 5 system made in accordance with the present invention. The display system functions by converting excitation light to emitted, visible light. In the embodiment illustrated, each pixel 10 in display 5 is comprised of one or more sub-pixels; sub-pixels are typically comprised of a red sub-pixel 11, a green sub-pixel 12, and a blue sub-pixel 13, as shown in FIG. 2. Colors other than red, green, and blue are caused by the admixture of these primary colors thus controlling the intensity of which the individual sub-pixels adjusts both the brightness and color of a pixel 10. Those skilled in the art understand that other primary color selections are possible and will lead to a full color display. Color generation in the display is a consequence of the mixing of multiple-wavelength light emissions by the viewer. This mixing is accomplished by the viewer's integration of spatially distinct, differing wavelength light emissions from separate sub-pixels that are below the spatial resolution limit of the viewer's eye. Typically a color display has red, green, and blue separate and distinct sub-pixels, comprising a single variable color pixel. Monochrome displays may be produced by the use of a single color pixel 10 or sub-pixel 11, 12, 13, or by constructing a single pixel capable of emitting "white" light. The spectral characteristics of a monochrome display pixel will be determined by the choice of lumiphore or combination of lumiphores. White light generation can be accomplished through the use of multiple doping schemes for the light emitting resonator 30 as described by Hatwar and Young in U.S. Pat. No. 6,727,644B2. Photo-luminescence is used to produce the separate wavelength emission from each pixel (or subpixel) element. The photo-luminescence may be a result of a number of physically different processes including, multi-step, photonic up-conversion processes and the subsequent radiative emission process, direct optical absorption and the subsequent radiative emission process, or optical absorption followed by one or more energy transfer steps, and finally, the subsequent radiative emission process. Use of combinations of these processes may also be considered to be within the scope of this invention.

FIG. 1 is schematic top view of an optical flat panel display 5 made in accordance with the present invention. The display 5 contains an array 7 of light emitters comprised of a matrix of pixels 10 each having a light emitting resonator 30 (shown in FIGS. 2A, B, and C) located at each intersection of an optical row waveguide 25 and column electrodes 28. A power source 22 is used to activate the light source array 15. The light source array 15 provides optical power or light 20, used to excite the photo-luminescent process in each pixel 10. Typical light source array elements 17 may be diode lasers, infrared laser, light emitting diodes (LEDs), and the like. These may be coherent or incoherent light sources. These light sources may be visible, ultraviolet, or infrared light sources. There may be a one-to-one correspondence between the light source array element 17, and an optical row waveguide 25, or alternatively, there may be a single light source array element 17 multiplexed onto a number of optical row waveguides 25, through the use of an optical switch to redirect the light 20 output from the single light source array element 17.

A principal component of the photo-luminescent flat panel display system 5 is the optical row waveguide 25, also known as a dielectric waveguide. Two key functions are provided by the waveguides 25. They confine and guide the optical power to the pixel 10. Several channel waveguide structures have been illustrated in U.S. Pat. No. 6,028,977. The optical waveguides must be restricted to TM and TE propagation modes. TM and TE mode means that optical field orientation is perpendicular to the direction of propagation. Dielectric waveguides confining the optical signal in this manner are called channel waveguides. The buried channel and embedded strip guides are applicable to the proposed display technology. Each waveguide consists of a combination of cladding and core layer. These layers are fabricated on either a glass-based or polymer-based substrate. The core has a refractive index greater than the cladding layer. The core guides the optical power past the resonator in the absence of power coupling. With the appropriate adjustment of the distance between the optical row waveguide 25 and the light emitting resonator 30, power is coupled into the light emitting resonator 30. At the light emitting resonator 30 the coupled optical light power drives the resonator materials into a luminescent state. The waveguides 25 and resonators 30 can be fabricated using a variety of conventional techniques including microelectronic techniques like lithography. These methods are described, for example, in "High-Finesse Laterally Coupled Single-Mode Benzocyclobutene Microring Resonators" by W. -Y. Chen, R. Grover, T. A. Ibrahim, V. Van, W. N. Herman, and P. -T. Ho, IEEE Photonics Technology Letters, 16(2), p. 470. Other low-cost techniques for the fabrication of polymer waveguides can be used such as imprinting, and the like. Nano-imprinting methods have been described in "Polymer microring resonators fabricated by nanoimprint technique" by Chung-yen Chao and L. Jay Gao, J. Vac. Sci. Technol. B 20(6), p. 2862. Photobleaching of polymeric materials as a fabrication method has been described by Joyce K. S. Poon, Yanyi Huang, George T. Paloczi, and Amnon Yariv, in "Wide-range tuning of polymer microring resonators by the photobleaching of CLD-1 chromophores" by, Optics Letters 29(22), p. 2584. This is an effective method for post fabrication treatment of optical microresonators. A wide variety of polymer materials are useful in this and similar applications. Theses can include fluorinated polymers, polymethylacrylate, liquid crystal polymers, and conductive polymers such as polyethylene dioxythiophene, polyvinyl alcohol, and the like. These materials and additionally those in the class of liquid crystal polymers are suitable for this application (see "Liquid Crystal Polymer (LCP) for MEMs", by X. Wang et. al., J. Micromech. MicroEng, 13, (2003), p. 628-633.) This list is not intended to be all inclusive of the materials that may be employed for this application.

Excitation of the light emitting resonator 30 (shown in FIGS. 2A, B, and C) by the row waveguide 25 under the control of the column voltage source 18 and column electrodes 28 causes the light emitting resonator 30 to emit visible light. The excitation of the light emitting resonator 30 is caused by optical pumping action of the light 20 shown in FIG. 1 from a row light source array element 17 through the row waveguide 25 and controlling voltage to the column electrodes 28 by multiplex controller 19 from a column voltage source 18. The excitation process is a coordinated row-column, electrically activated, optical pumping process called electro-optical addressing. Those skilled in the art know that the roles of columns and rows are fully interchangeable without affecting the performance of this display 5.

Figure 2A:
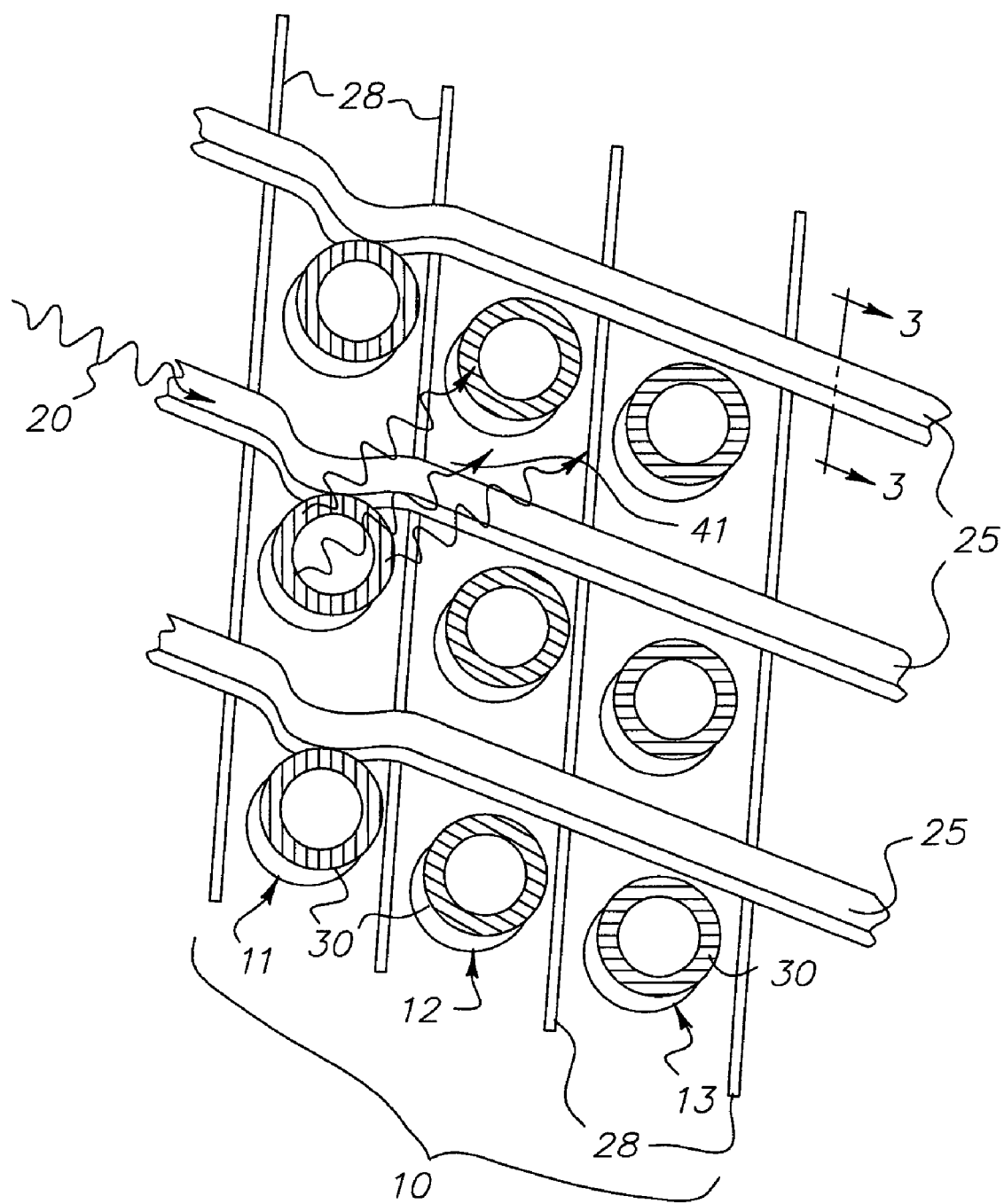
FIGS. 2A, 2B and 2C are enlarged top plan views of red light, green light and blue light emitting resonators for a color display made in accordance with the present invention.

Now referring to FIG. 2A, electro-optical addressing is defined as a method for controlling an array 7 (not shown) of light emitting resonators 30 that form the optical flat panel display 5 (see FIG. 1). In FIG. 2A, a pixel 10 comprised of three sub-pixels, 11, 12, and 13 is shown. In electro-optical addressing, the selection of a particular pixel that appears to be light emitting is accomplished by the specific combination of excitation of light in a particular optical row waveguide 25, and voltage applied to a particular set of column electrodes 28.

The light emitting resonator 30 is excited into a photoluminescent state through the absorption of light 20 as a result of the close proximity to the row waveguides 25. The physics of the coupling of energy between the resonator 30 and the optical row waveguide 25 is well known in the art. It is known to depend critically upon the optical path length between the row waveguide 25 and the light emitting resonator 30; it can therefore be controlled by the distance (h shown in FIGS. 6A and 6B) separating the two structures or by various methods of controlling the index of refraction. Typical methods for control of the index of refraction include heat, light, and electrical means; these are well known. These methods correspond respectively to the thermo-optic, photorefractive, and electro-optic methods. The invention disclosed herein makes use of control of the distance parameter via a MEMS device to control the energy coupling, and thus affect the intensity of photo-luminescent light generated in the pixel 10. In an example, the light emitting resonator 30 is composed of a light transmissive material but incorporating (doped with) a light emitting photo-luminescent species. The base material (the material excluding the photo-luminescent species or dopant) for the light emitting resonator may be the same or different from the optical row waveguide 25 material. Typical base materials can include glasses, semiconductors, or polymers.

Photo-luminescent species or dopants can include various fluorophores, or phosphors including up-converting phosphors. The selection of a particular dopant or dopants will primarily determine the emission spectrum of a particular light emitting resonator 30. These lumiphores (fluorophores or phosphors) may be inorganic materials or organic materials. The light emitting resonator 30 can include a combination of dopants that cause it to respond to the electro-optic addressing by emitting visible radiation. Dopant or dopants include the rare earth and transition metal ions either singly or in combinations, organic dyes, light emitting polymers, or materials used to make Organic Light Emitting Diodes (OLEDs). Additionally, lumiphores can include such highly luminescent materials such as inorganic chemical quantum dots, such as nano-sized CdSe or CdTe, or organic nanostructured materials such as the fluorescent silica-based nanoparticles disclosed in U.S. Patent Application Publication US 2004/0101822 by Wiesner and Ow. The use of such materials is known in the art to produce highly luminescent materials. Single rare earth dopants that can be used are erbium (Er), holmium, thulium, praseodymium, neodymium (Nd) and ytterbium. Some rare-earth co-dopant combinations include ytterbium, erbium, ytterbium, thulium and thulium: praseodymium. Single transition metal dopants are chromium (Cr), thallium (Tl), manganese (Mn), vanadium (V), iron (Fe), cobalt (Co) and nickel (Ni). Other transition metal co-dopant combinations include Cr:Nd and Cr:Er. The up-conversion process has been demonstrated in several transparent fluoride crystals and glasses doped with a variety of rare-earth ions. In particular, $CaF_2$ doped with $Er^{3+}$. In this instance, infrared up-conversion of the Er3+ ion can be caused to emit two different colors: red (650 nm) and green (550 nm). The emission of the system is spontaneous and isotropic with respect to direction. Organic fluorophores can include dyes such as Rhodamine B, and the like. Such dyes are well known having been applied to the fabrication of organic dye lasers for many years. The preferred organic material for the light emitting resonator 30 is a small-molecular weight organic host-dopant combination typically deposited by high-vacuum thermal evaporation. It is also preferred that the host materials used in the present invention are selected such that they have sufficient absorption of the excitation light 20 and are able to transfer a large percentage of their excitation energy to a dopant material via Förster energy transfer. Those skilled in the art are familiar with the concept of Förster energy transfer, which involves a radiationless transfer of energy between the host and dopant molecules. An example of a useful host-dopant combination for red-emitting lasers is aluminum tris(8-hydroxyquinoline) (Alq) as the host and [4-(dicyanomethylene)-2-t-butyl-6-(1,1,7,7-tetramethyljulolidyl-9-enyl)-4H-pyran] (DCJTB) as the dopant (at a volume fraction of 1%). Other host-dopant combinations can be used for other wavelength emissions. For example, in the green a useful combination is Alq as the host and [10-(2-benzothiazolyl)-2,3, 6,7-tetrahydro-1,1,7,7-tetramethyl-1H,5H,11H-[1] Benzopyrano[6,7,8-ij]quinolizin-11-one] (C545T) as the dopant (at a volume fraction of 0.5%). Other organic light emitting materials can be polymeric substances, e.g., polyphenylenevinylene derivatives, dialkoxy-polyphenylenevinylenes, poly-para-phenylene derivatives, and polyfluorene derivatives, as taught by Wolk et al. in commonly assigned U.S. Pat. No. 6,194,119B1 and references therein.

Figure 2B:
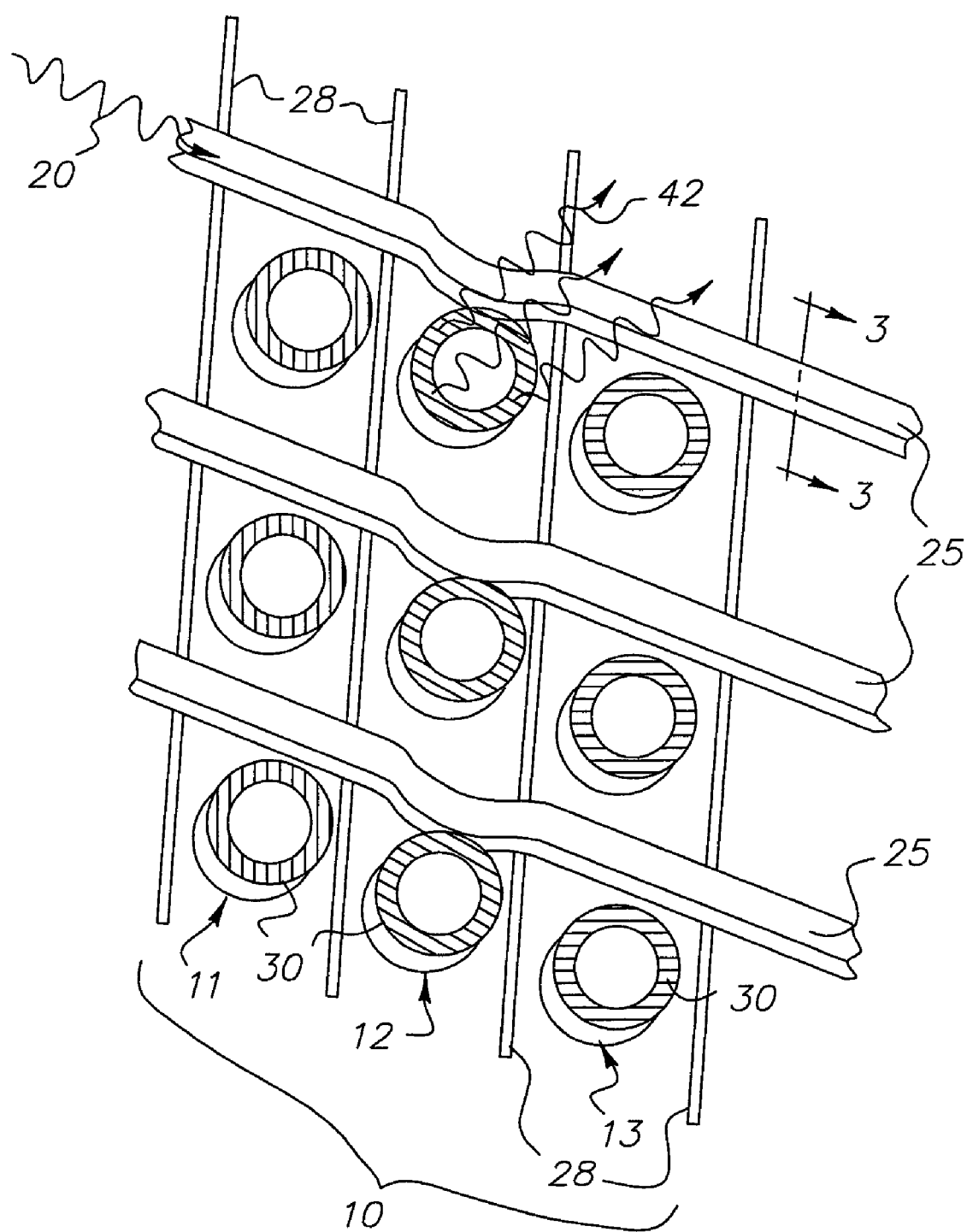
Figure 2C:
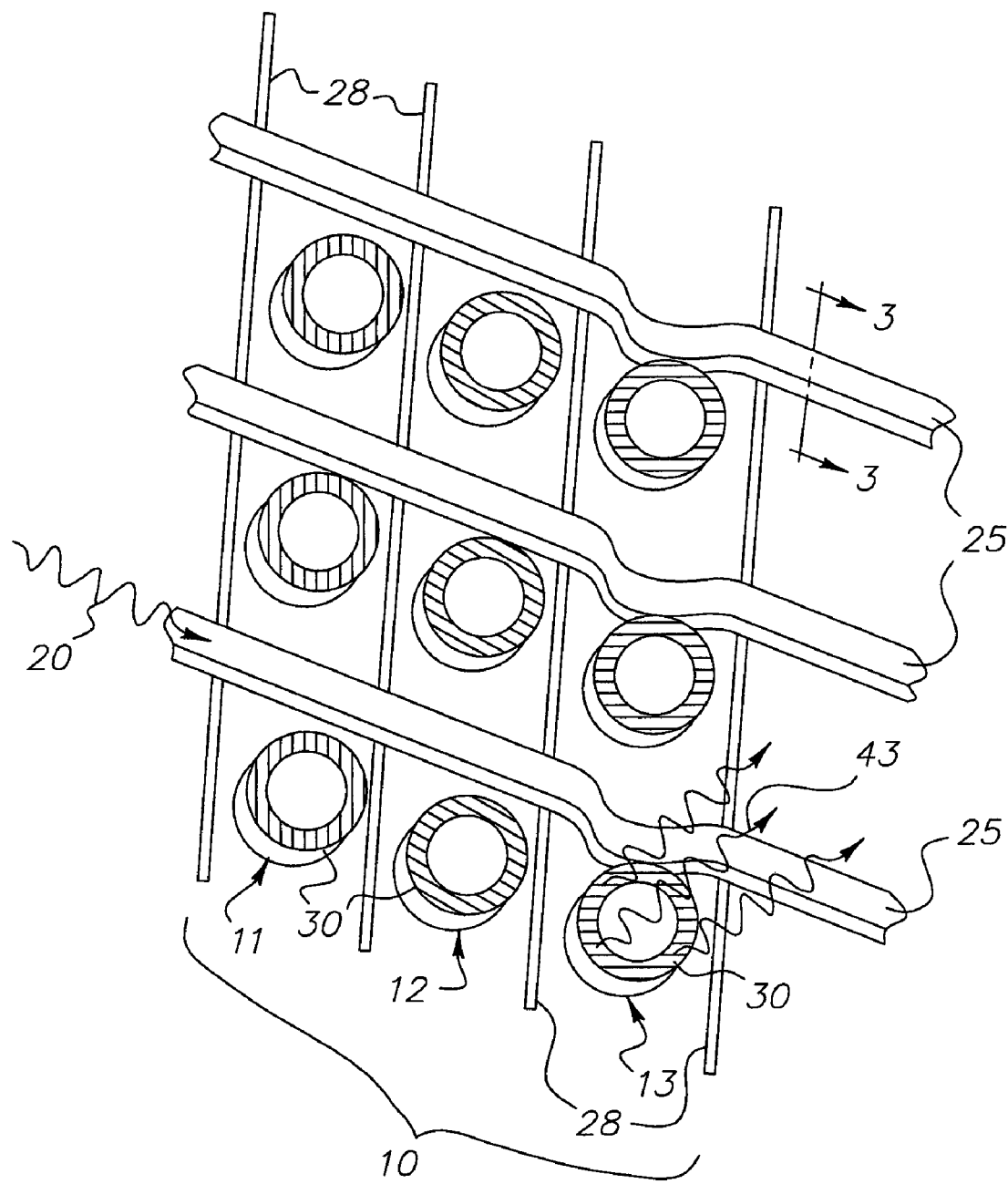
Figure 5:
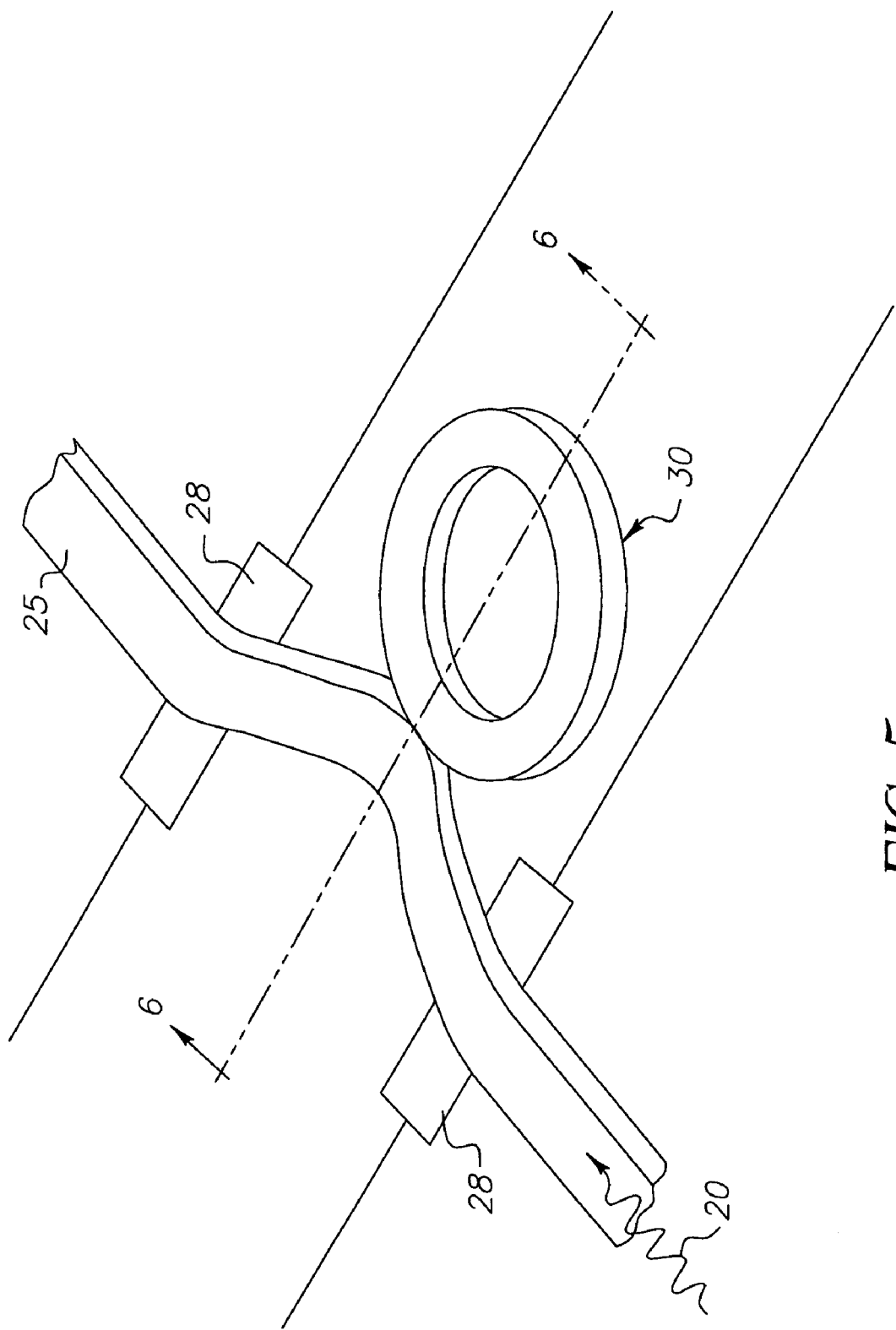
FIG. 5 is an enlarged perspective view of a portion of the display of FIG. 1 showing a single ring resonator, single associated optical waveguide and electrodes.

Electro-optical addressing employs the optical row waveguide 25 to deliver light 20 to a selected light emitting resonator 30. The light emitting resonator 30 is the basic building block of the optical flat panel display 5. Referring now to FIGS. 2A, 2B, and 2C, an enlarged top view of a red light 41, green light 42 and blue light 43 light emitting resonator 30 respectively, is illustrated respectively in these figures. Using the red light 41, green light 42 and blue light 43 light emitting resonators to create red 11, green 12, and blue 13 pixels, a full color optical flat panel display 5 can be formed. The wavelength of the emission of the red 41, green 42 and blue 43 light is controlled by the type of material used in forming the light emitting resonators 30. Selection of a particular pixel 10 or sub-pixel (11-13) is based upon the use of a MEMS device to alter the distance and affect the degree of power transfer of light 20 to the light emitting resonator 30. Note that in each instance, light 20 is directed within an appropriate optical row waveguide 25 to excite a particular light emitting resonator 30. Through the combination of excitation specific optical row waveguide with light 20 and excitation of a specific MEMS device, controlled by the column electrodes 28, a particular pixel 10 (subpixel) is excited. The light emitting resonator 30 may take the form of a micro-ring or a micro-disk. These forms are shown in FIGS. 2 and 5, respectively. Note that in order for the light emitting resonator 30 to produce sufficient light to be viewable, the resonator 30 must be fabricated in a manner so that it is 'leaky"; there are a number of methods to accomplish this lowering of the cavity Q, including but not limited to increasing the surface roughness of the resonator cavity surface. Additionally, one could lower the refractive index of the material comprising the light emitting resonator 30.

Figure 3:
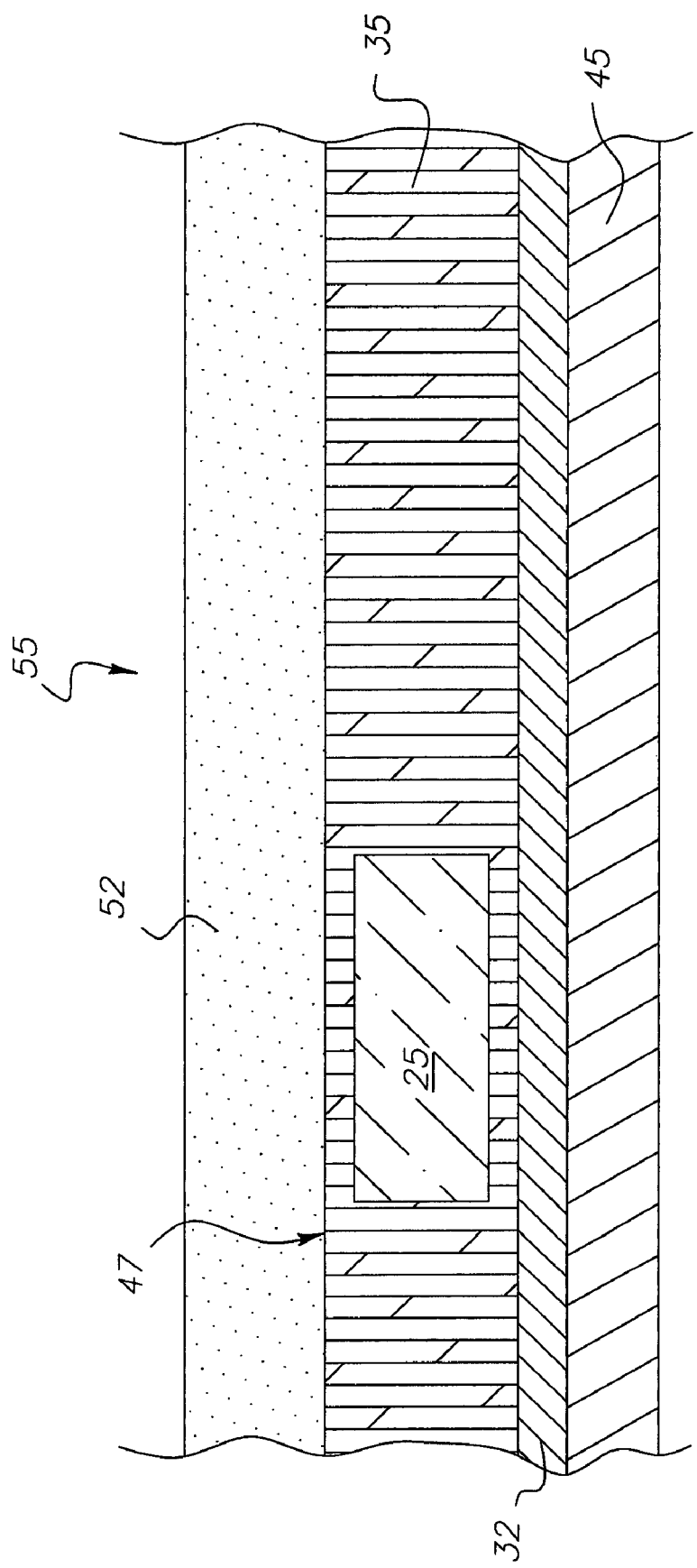
FIG. 3 is an enlarged cross-sectional view of the optical waveguide as taken along line 3-3 of FIG. 2.

The display substrate or support 45 (see FIG. 3) can be constructed of either a silicon, glass or a polymer-based substrate material. A number of glass and polymer substrate materials are either commercially available or readily fabricated for this application. Such glass materials include: silicates, germanium oxide, zirconium fluoride, barium fluoride, strontium fluoride, lithium fluoride, and yttrium aluminum garnet glasses. A schematic of an enlarged cross-sectional view of the optical flat panel display 5 taken along the line 3-3 of FIG. 2 is shown in FIG. 3. The column electrodes 28 are not shown for simplicity. On a substrate 45 is formed a layer 35 containing the optical row waveguide 25 and the light emitting resonator. For such a buried-channel waveguide structure it is imperative that the refractive index of optical row waveguide 25 (the core) be greater than the surrounding materials, in this instance the layer 35. The layer 35 acts as the cladding region in this embodiment. An optional layer 32 is shown; this may be of a relatively lower index material in order to better optically isolate the optical row waveguide 25. A top layer 52 is provided on the top surface 47 of layer 35 for protection of the underlying structures. In the case of FIG. 3 the entire structure is shown surrounded by air 55.

Integrated semiconductor waveguide optics and microcavities have raised considerable interest for a wide range of applications, particularly for telecommunications applications. The invention disclosed herein applies this technology to electronic displays. As stated previously, the energy exchange between cavities and waveguides is strongly dependent on the spatial distance. Controlling the distance between waveguides and microcavities is a practical method to manipulate the power coupling and hence the brightness of a pixel 10 or sub-pixel (11-13).

Figure 4:
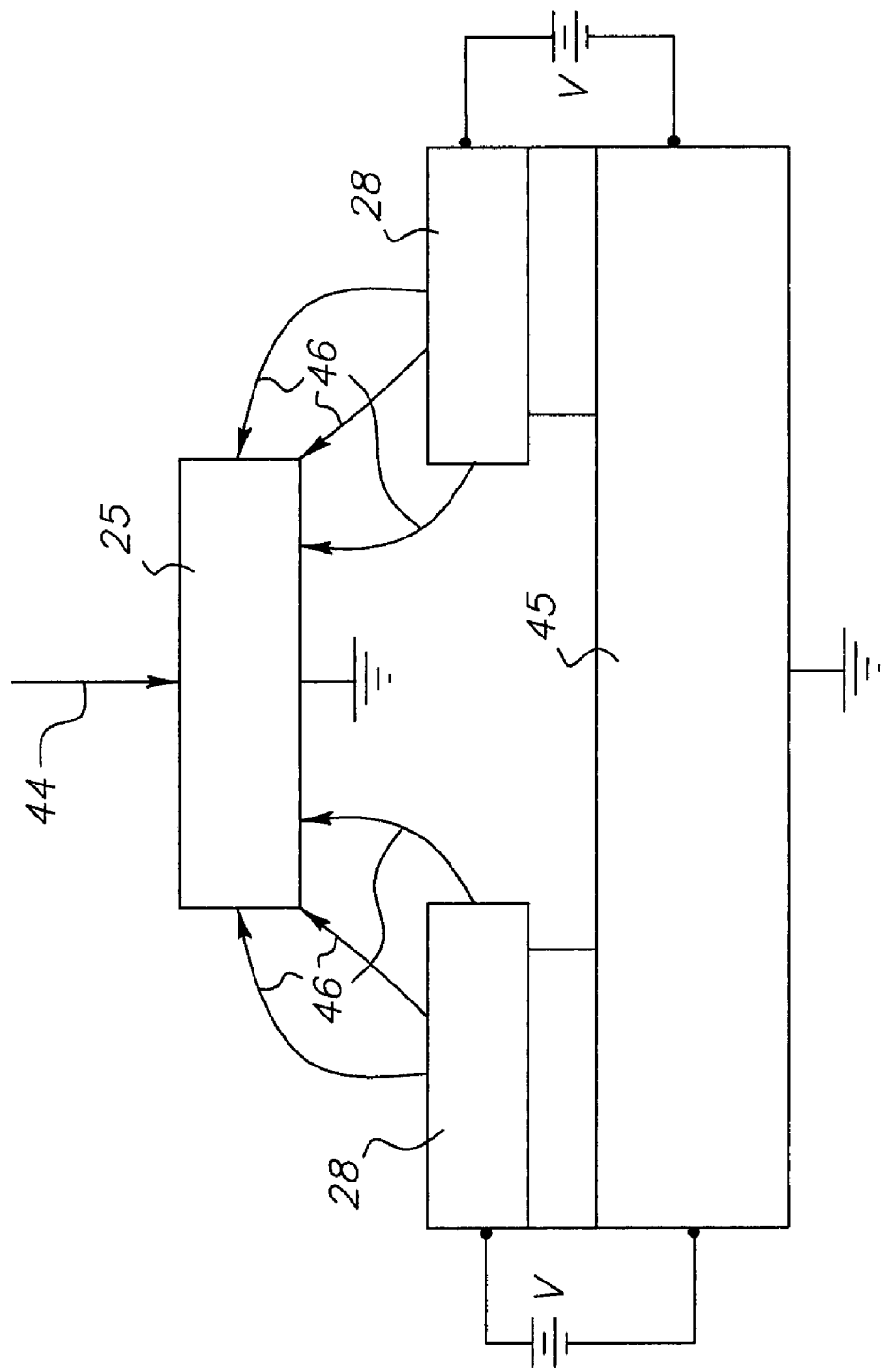
FIG. 4 is an enlarged cross-sectional schematic view of the optical waveguide showing the electrode geometry and electrostatic forces.

An ideal resonator or cavity has characteristics of high quality factor (which is the ratio of stored energy to energy loss per cycle) and small mode volume. Dielectric microsphere and micro-toroid resonators have demonstrated high quality factors. Micro-cavities possess potential to construct optical resonators with high quality factor and ultra-small mode volume due to high index-contrast confinement. Small mode volume enables small pixel 10 or sub-pixel (11-13) dimensions, consistent with the requirements of a high resolution display. A MEMS device structure for affecting the amount of light 20 coupled into a light emitting resonator 30 is shown in FIG. 4. FIG. 4 is an enlarged cross-sectional view of the optical waveguide showing the electrode geometry, field lines 46, and resulting downward electrostatic force 44 for affecting the power coupling change. MEMS actuators using electrostatic forces in this instance, move a waveguide to change the distance $h_e$, shown in FIG. 6A between a resonator and the optical row waveguide 25, resulting in a wide tunable range of power coupling ratio by several orders of magnitude which is difficult to achieve by other methods. Based on this mechanism, the micro-disk/waveguide system can be dynamically operated in the under-coupled, critically-coupled and over-coupled condition.

In high-Q micro-resonators, varying the gap spacing or distance h, between the waveguide and the micro-disk or micro-ring resonator by simply a fraction of a micron leads to a very significant change in the power transfer to the light emitting resonator 30 from the optical row waveguide 25. FIG. 5 is an enlarged perspective view of the display of FIG. 1 showing a light emitting ring resonator 30; optical waveguide 25, and electrodes 28. As shown in FIG. 5, a suspended waveguide is placed in close proximity to the micro-ring or micro-toroid light emitting resonator 30. The initial gap (not shown) (~1 μm wide) is large so there is no coupling between the waveguide and the resonator. Referring to FIG. 5, the suspended optical row waveguide 25 can be pulled towards the micro-ring resonator by four electrostatic gap-closing actuators, the electrodes 28. Therefore, the coupling coefficient can be varied by applied voltage. For high index-contrast waveguides, the coupling coefficient is very sensitive to the critical distance. 1-um displacement can achieve a wide tuning range in power coupling ratio, which is more than five orders of magnitude. Typically, the radius of micro-ring resonator is 10 μm and the width of waveguide is 0.7 μm. But these sizes may vary depending upon the display type and application. In FIG. 5 the optical waveguide 25 is shown displaced downward so as to affect a maximum power transfer to the light emitting resonator 30.

Figure 6A:
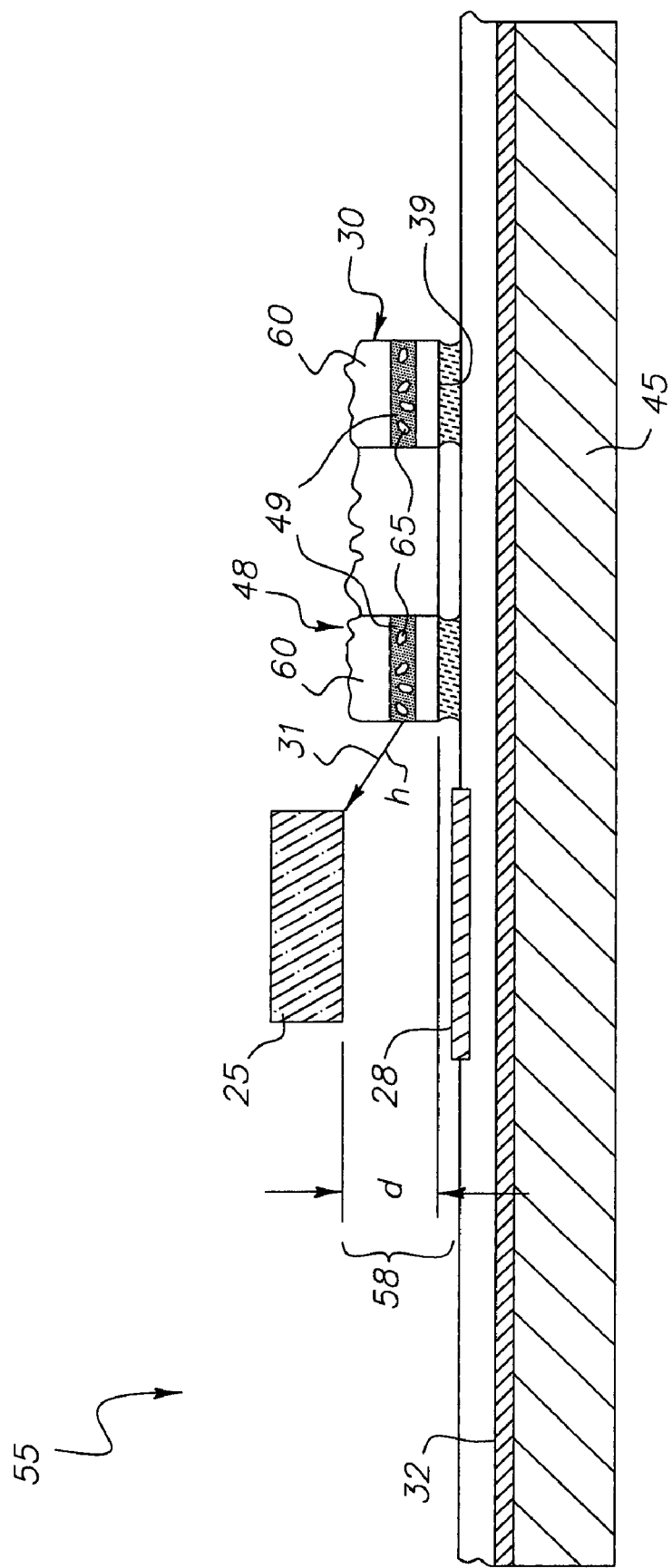
FIGS. 6A, B and C are enlarged cross-sectional views of the display of FIG. 5 taken along line 6-6 of FIG. 5, which shows the location of a MEMS device used to control the pixel intensity at various intensity positions.

FIG. 6A is an enlarged cross-sectional view of the display of FIG. 5, which shows the location of a MEMS device used to control the pixel intensity. The area surrounding the optical row waveguide 25 and the light emitting ring resonator 30 has been etched back to expose the top surfaces 48 to air 55. The optical row waveguide 25 is aligned to the edge of the light emitting resonator 30 and vertically displaced to preclude a high degree of coupling. The waveguide 25 is electrically grounded and actuated by a pair of electrodes 28 at the two ends, which forms an electro-coupling region 58. Due to the electrostatic force, the waveguide is pulled downward toward the light emitting resonator 30, resulting in the decreased gap-spacing h. The optical row waveguide 25 is shown in the rest position d in FIG. 6A. In FIG. 6A, the distance between the optical row waveguide 25 and the light emitting ring resonator 30 is large; coupling of light into the light emitting resonator 30 is precluded and there is no light emission from the pixel.

Figure 6B:
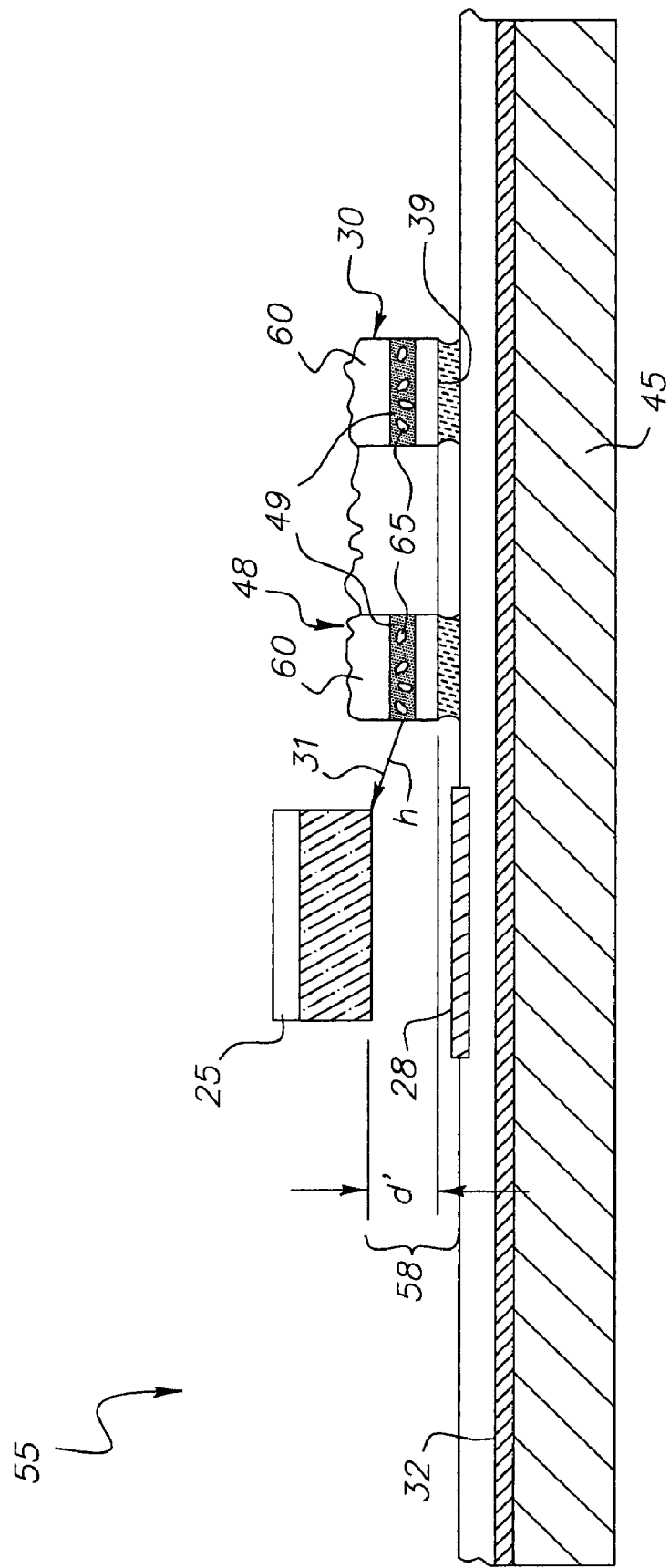
Figure 6C:
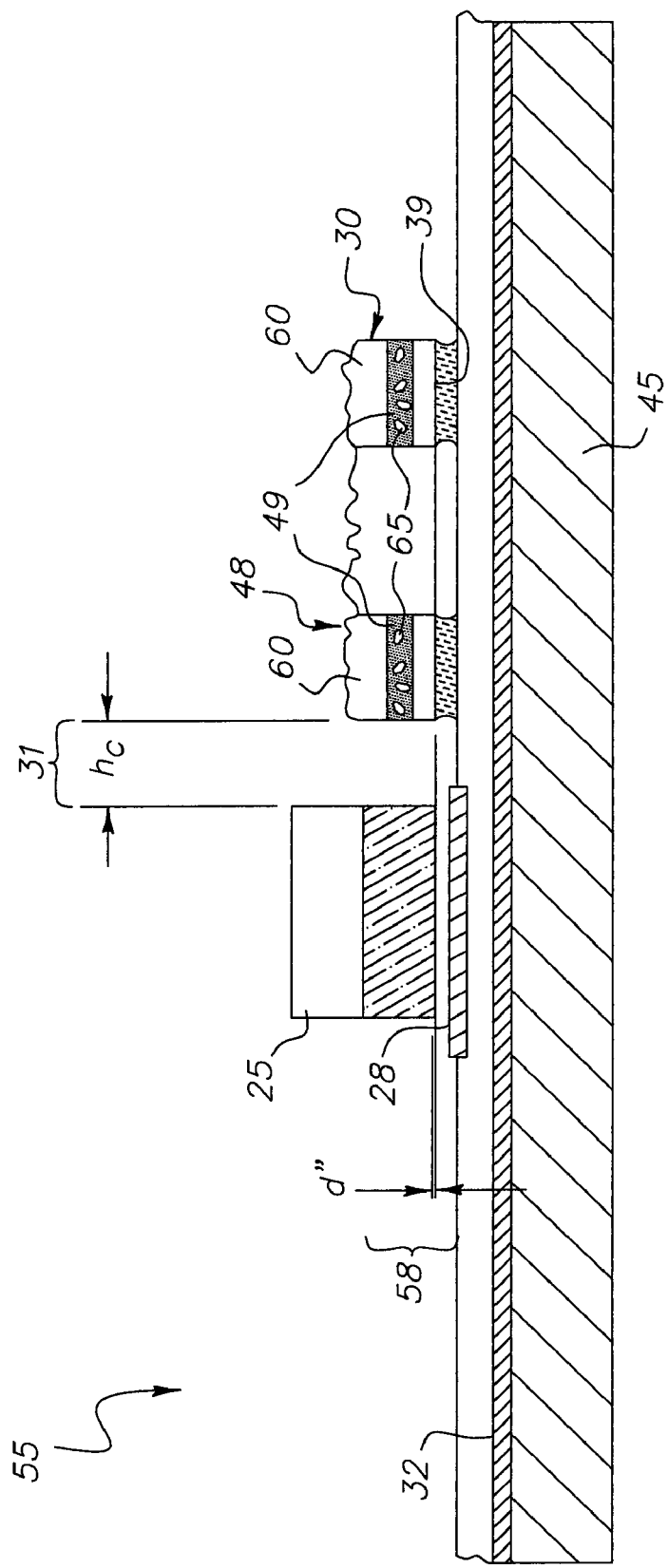

Initially, in the absence of the application of the control voltage, the optical row waveguide 25 is separated from the light emitting resonator by a distance significantly greater than the critical distance "$h_c$" 31 (see FIG. 6C) and hence there is no light emission from the light emitting resonator 30. In FIG. 6B, the vertical distance d" is shown where there exists a degree of coupling between the optical row waveguide 25 and the light emitting ring resonator 30, and hence light emission from the pixel occurs. By varying the distance d', the intensity of the light emission from the pixel can be varied in a controllable manner. In FIG. 6C, the distance d' is shown that corresponds to the displacement of the optical row waveguide 25 necessary to place the optical row waveguide 25 at the critical coupling distance $h_c$ and thereby optimize power coupling. This configuration will produce the maximum emitted light intensity from the pixel. Note that light emitting resonator is shown with a roughened surface 60; this will be discussed below. The optical row waveguide can be fabricated from silicon appropriately doped to provide electrical conductivity. Alternatively, the optical row waveguide can be fabricated from other optically transparent conductive materials such as polymers that meet the optical index of refraction requirement disclosed above.

In the embodiment shown in FIG. 6C, the light emitting resonator 30 is shown spaced the critical distance 31, $h_c$ from the optical row waveguide 25. Excitation light 20 is emitted from top roughened surface 60 of the light emitting resonator 30, which causes the light emitting resonator to leak light and become visible to a viewer. As shown in FIG. 6C, a light emitting layer 49 is placed within the light emitting resonator. This layer 49 contains photo-luminescent species or lumiphores 65 that absorb the pump or excitation light 20 and via the luminescence processes discussed above, produce the visible light directed to the viewer. The wavelength of the light produced in the emitting layer 49 is determined by the material composition as previously disclosed. The light emitting layer 49 may be formed on the top surface of the light emitting resonator 30 as well as placed within the internal structure of the light emitting resonator as is shown in FIG. 6C. FIG. 6C shows the emitting layer 49 displaced vertically from the bottom surface 39 of light emitting resonator 30.

Figure 7:
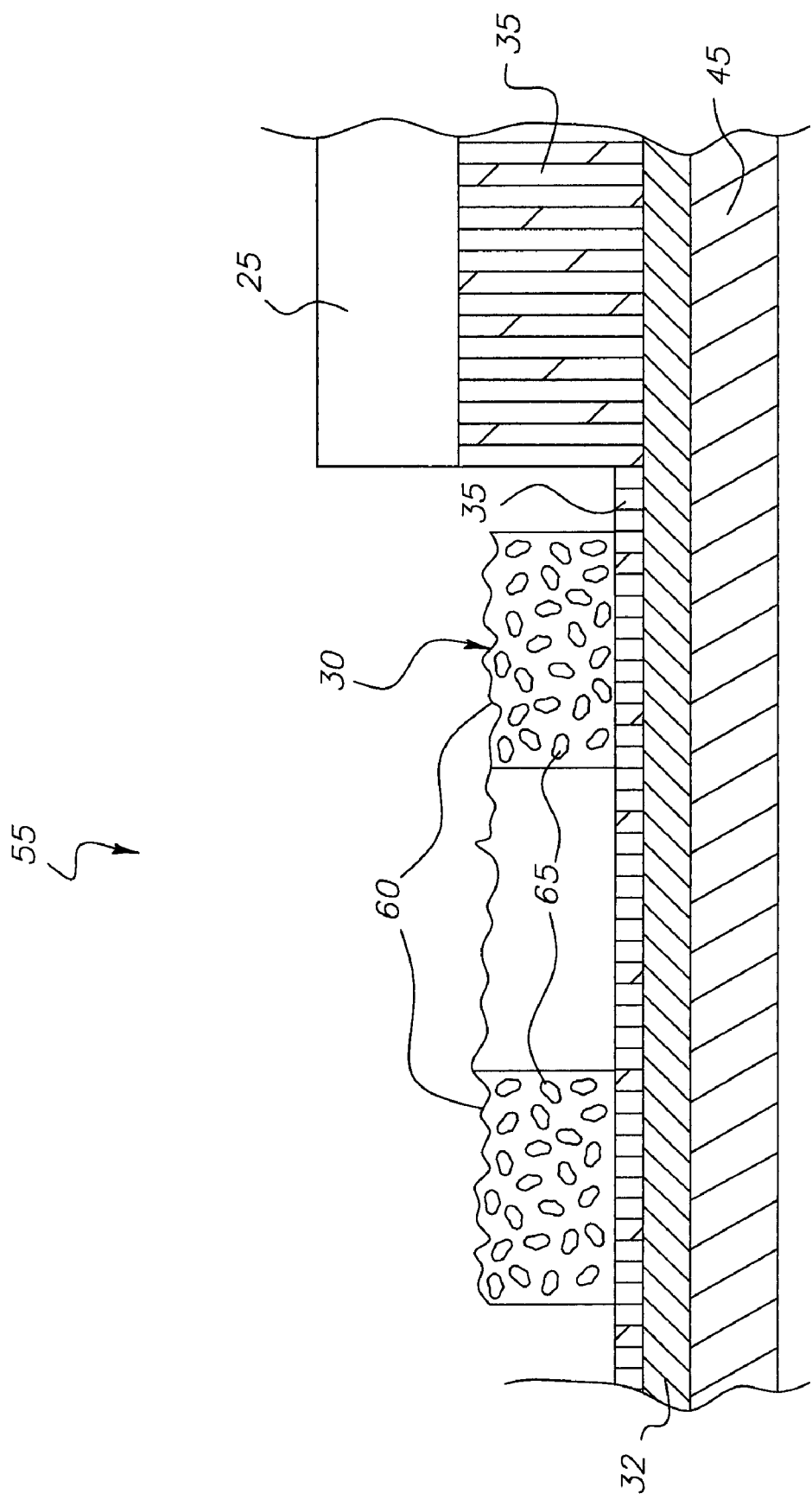
FIG. 7 is an enlarged cross-sectional view of the waveguide and resonator elements showing an alternative embodiment for the light-emissive resonator.

FIG. 7 is an enlarged cross-sectional view of the resonator elements showing an alternative embodiment for the light-emissive resonator 30. In this embodiment the lumiphores 65 are shown uniformly distributed within the light emitting resonator 30.

Figure 8:
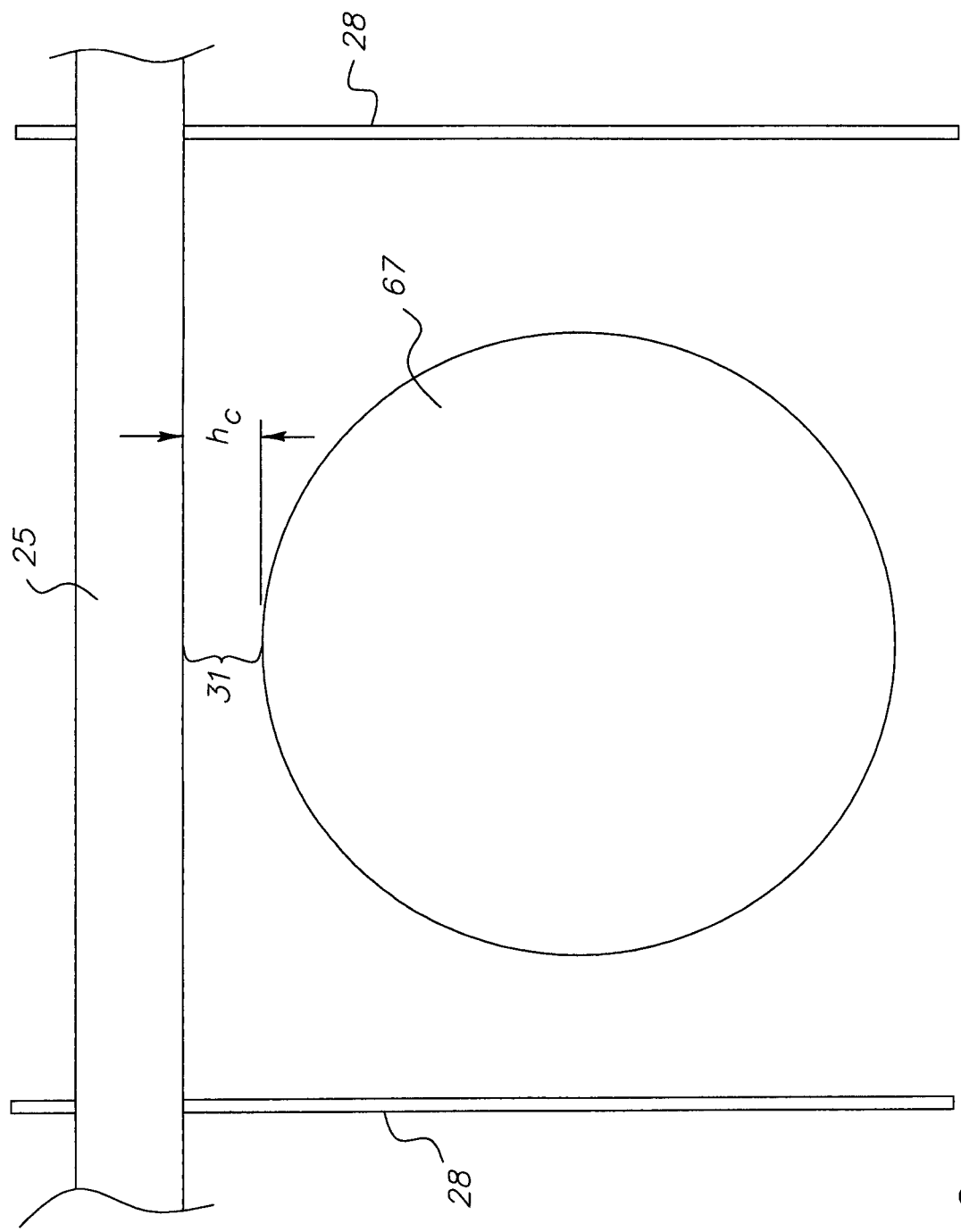
FIG. 8 is an enlarged top plan view showing an alternative resonator embodiment in the form of a disk.

FIG. 8 is an enlarged top plan view showing an alternative resonator embodiment in the form of a disk. The critical distance "$h_c$" 31 is shown as well as the light emitting disk 67 resonator. A number of structures have been demonstrated for the resonator element including ring, disk, elliptical and racetrack or oval structures. The coupling of optical power into such structures is well known to those skilled in the art. The use of such structures as light emitting resonators is considered within the scope of this invention.

The invention has been described with reference to a preferred embodiment however, it will be appreciated that variations and modifications can be affected by a person of ordinary skill in the art without departing from the scope of the invention. In particular, it is well known in the art that the optical row waveguide 25 can be placed adjacent to the light emitting resonator 30 in the same horizontal plane, and tuned for power transfer by affecting a lateral, that is in-plane or horizontal displacement, rather than the vertical displacements depicted above. Additionally, it may be advantageous to place the optical row waveguide 25 above the light emitting resonator 30 adjacent to the periphery of the light emitting resonator 30. In this latter case the electro-coupling region 58 would be placed vertically above the edge of the light emitting resonator 30 and power transfer affected by a vertical displacement of the optical row waveguide 25 relative to the top surface of the light emitting resonator 30. Many other such variations are possible and considered within the scope of this invention.

PARTS LIST 5 display
7 array
10 pixel
11 red sub-pixel
12 green sub-pixel
13 blue sub-pixel
15 light source array
17 light source array element
18 column voltage source
19 multiplex controller
20 light
22 power source
25 row waveguide
28 column electrodes
30 light emitting resonator
31 critical distance
32 optional layer
35 layer
39 bottom surface of light emitting resonator
41 red light
42 green light
43 blue light
44 force
45 support
46 field lines
47 top surface
48 top surface
49 emitting layer
52 top layer
55 air
58 electro-coupling region
60 roughened surface
65 lumiphores
67 light emitting resonator disk

What is claimed is:

1. A display device comprising:
   a. a support substrate;
   b. a plurality of light emitting resonators placed in a matrix on said support substrate forming a plurality of rows and columns of said light emitting resonators;
   c. a plurality of light waveguides positioned on said substrate such that each of said light emitting resonators is associated with an electro-coupling region with respect with to one of said plurality of light waveguides;
   d. a deflection mechanism for causing relative movement between a portion of at least one of said plurality of light waveguides and said associated light emitting resonator for controlling when said light emitting resonator is in said electro-coupling region; and
   e. a light source associated with each of said plurality of light waveguides for transmitting a light along said plurality of light waveguides for selectively activating each of said light emitting resonators when positioned within said electro-coupling region.

2. A display device according to claim 1 wherein said light source comprises an infrared light source.

3. A display device according to claim 2 wherein said infrared light source comprises a laser infrared light source.

4. A display device according to claim 1 wherein said light source comprises a light emitting diode.

5. A display device according to claim 1 wherein said plurality of light emitting resonators comprises light emitting resonators.

6. A display device according to claim 5 wherein said light emitting resonators have a roughened surface.

7. A display device according to claim 6 wherein said light emitting resonators comprises an upconverting phosphor.

8. A display device according to claim 6 wherein an emissive coating is provided over said roughened surface.

9. A display device according to claim 1 wherein an overcoat is provided over said plurality of light emitting resonators and light waveguides.

10. A display device according to claim 1 wherein said deflection mechanism comprises at least one electrode provided for deflection of said portion of said waveguides.

11. A display device according to claim 1 wherein said deflection mechanism comprises a pair of electrodes provided for deflection on said portion of said waveguides.

12. A display device according to claim 1 wherein said deflection mechanism comprises a pair of electrodes disposed on both sides of at least one of light emitting resonator and passing adjacent with at least one of said plurality of light waveguides whereby when a voltage is applied across said pair of electrodes a field is produced that causes said at least one waveguide to move into said electro-coupling region.

13. A display device according to claim 12 wherein a control mechanism is provided for controlling the amount of said voltage across said pair of electrodes for controlling the distance in which said at least one waveguide moves into said electro-coupling region so as to control the amount of emission from said associated light emitting resonator.

14. A display device according to claim 1 wherein said plurality of light emitting resonator are grouped into sets wherein each of said leaky resonators emit a different color.

15. A display device according to claim 1 wherein at least one of said plurality of light emitting resonators have a ring shaped.

16. A display device according to, claim 1 wherein at least one said plurality of light emitting resonators is disc shaped.

17. A method for controlling visible light emitting from a display device having a plurality of light emitting resonators placed in a pattern forming a plurality of rows and columns and a plurality of wave light guides positioned so that each of said light emitting resonators is positioned adjacent one of said plurality of wave light guides comprising the steps of:
   a. providing a light source associated with each of said plurality of light waveguides for transmitting a light along said associated light waveguide;
   b. providing deflection mechanism for causing relative movement between a portion of at least one of said plurality of light waveguides and said associated light emitting resonator for controlling when said light emitting resonator is in said electro-coupling region;
   c. selectively controlling emission of visible light from said plurality of light emitting resonators by controlling said deflection mechanism and light source such that when said light emitting resonator in said electro-coupling region and a light is transmitted along said associated light waveguide said emission of visible light will occur.

18. The method according to claim 17 wherein deflection mechanism for causing relative movement comprises a pair of electrodes associated with each of said plurality of light emitting resonators, further comprising the step of controlling the amount of relative movement by controlling the voltage applied across said pair of electrodes.

19. The method according to claim 17 wherein said light source comprises an infrared light source.

20. The method according to claim 19 wherein said infrared light source comprises a laser infrared light source.

21. The method according to claim 17 wherein said light source comprises a light emitting diode.

22. The method according to claim 17 wherein said deflection mechanism comprises at least one electrode provided for deflection of said portion of said waveguides.

23. The method according to claim 17 wherein said deflection mechanism comprises a pair of electrodes provided for deflection of said portion of said waveguides.

24. The method according to claim 17 wherein said deflection mechanism comprises a pair of electrodes disposed on both sides of at least one of said light emitting resonator and passing adjacent with at least one of said plurality of light waveguides whereby when a voltage is applied across said pair of electrodes a field is produced that causes said at least one waveguide to move into said electro-coupling region.

25. The method according to claim 24 wherein a control mechanism is provided for controlling the amount of said voltage across said pair of electrodes for controlling the distance in which said at least one waveguide moves into said electro-coupling region so as to control the amount of emission from said associated light emitting resonator.

26. The method according to claim 17 wherein said plurality of light emitting resonator are grouped into sets wherein each of said resonators emit a different color.

27. The method according to claim 17 wherein at least one of said plurality of light emitting resonators have a ring shaped.

28. The method according to claim 17 wherein at least one said plurality of light emitting resonators is disc shaped.

29. The method according to claim 17 wherein said light source comprises an infrared light source.

30. The method according to claim 17 wherein said infrared light source comprises a laser infrared light source.

31. The method according to claim 17 wherein said light source comprises a light emitting diode.

\* \* \* \* \*